United States Patent
Vaishnavi et al.

(10) Patent No.: US 11,102,075 B2
(45) Date of Patent: Aug. 24, 2021

(54) SYSTEM AND METHOD FOR PROGRAMMING AND/OR MANAGEMENT OF CORE NETWORK SLICES

(71) Applicant: Huawei Technologies Co., Ltd., Shenzhen (CN)

(72) Inventors: Ishan Vaishnavi, Munich (DE); Xueli An, Munich (DE); Chenghui Peng, Munich (DE); Riccardo Trivisonno, Munich (DE); Jianjun Wu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/449,753

(22) Filed: Jun. 24, 2019

(65) Prior Publication Data

US 2019/0312782 A1 Oct. 10, 2019

Related U.S. Application Data

(63) Continuation of application No. PCT/EP2016/082624, filed on Dec. 23, 2016.

(51) Int. Cl.
*G01R 31/08* (2020.01)
*H04L 12/24* (2006.01)
(Continued)

(52) U.S. Cl.
CPC ...... *H04L 41/0893* (2013.01); *H04L 41/0806* (2013.01); *H04W 12/08* (2013.01);
(Continued)

(58) Field of Classification Search
None
See application file for complete search history.

(56) References Cited

U.S. PATENT DOCUMENTS

2008/0285449 A1 11/2008 Larsson et al.
2013/0311623 A1 11/2013 Kanada et al.
(Continued)

FOREIGN PATENT DOCUMENTS

CN 104363159 A 2/2015
EP 2256942 A1 12/2010
(Continued)

OTHER PUBLICATIONS

"Network Function Virtualization (NFV); Use Cases," GS NFV-MAN 001, V0.0.5, XP14284659A, pp. 1-37, European Telecommunications Standards Institute (ETSI), Sophia-Antipolis, France (Sep. 2016).
(Continued)

*Primary Examiner* — Gerald A Smarth
(74) *Attorney, Agent, or Firm* — Leydig, Voit & Mayer, Ltd.

(57) ABSTRACT

A network slice programming and management system is provided, for slicing a network to multiple groups of logical network slices composed of a collection of logical network functions, each dedicated to supporting a specific respective use for subscribers of the slice. The system comprises of a programming interface configured to receive commands for creation and/or configuration of network slice design comprising the constraints and requirements defining an architecture of logical network functions that when deployed form a network slice of a network, the commands include selection of at least one network function and a definition of an interaction of the selected at least one network function with other network functions.

18 Claims, 10 Drawing Sheets

(51) Int. Cl.
*H04W 12/08* (2021.01)
*H04W 48/18* (2009.01)
*H04W 16/00* (2009.01)
*H04W 24/02* (2009.01)

(52) U.S. Cl.
CPC ........... *H04W 16/00* (2013.01); *H04W 24/02* (2013.01); *H04W 48/18* (2013.01)

(56) References Cited

U.S. PATENT DOCUMENTS

| | | | |
|---|---|---|---|
| 2015/0263891 A1* | 9/2015 | Baugher | H04L 41/5041 370/254 |
| 2016/0352734 A1 | 12/2016 | Senarath et al. | |
| 2016/0353422 A1 | 12/2016 | Vrzic et al. | |
| 2016/0359682 A1 | 12/2016 | Senarath et al. | |
| 2017/0104609 A1* | 4/2017 | Mcnamee | H04M 15/61 |
| 2017/0332421 A1* | 11/2017 | Sternberg | H04W 76/11 |
| 2017/0359265 A1* | 12/2017 | Bosch | H04L 47/14 |
| 2018/0131578 A1* | 5/2018 | Cui | H04L 49/70 |
| 2018/0139129 A1* | 5/2018 | Dowlatkhah | H04L 63/08 |
| 2019/0159119 A1* | 5/2019 | Djordjevic | H04W 8/18 |

FOREIGN PATENT DOCUMENTS

| | | |
|---|---|---|
| JP | 2016054451 A | 4/2016 |
| WO | 2016192636 A1 | 12/2016 |

OTHER PUBLICATIONS

"Network Function Virtualization (NFV) Management and Orchestration," GS NFV-MAN 001, V0.8.1, XP14216382, pp. 1-189, European Telecommunications Standards Institute (ETSI), Sophia-Antipolis, France (Nov. 2014).

Trivosonno et al., "SDN-based 5G mobile networks: architecture, functions, procedures and backward compatibility," Transactions on Emerging Telecommunications Technologies, pp. 1-11, Huawei European Research Institute, Munich, Germany (Nov. 8, 2014).

CN/201680091834.5, Office Action/Search Report, dated Nov. 2, 2020.

* cited by examiner

SYSTEM AND METHOD FOR PROGRAMMING AND/OR MANAGEMENT OF CORE NETWORK SLICES

CROSS-REFERENCE TO RELATED APPLICATIONS

This application is a continuation of International Application No. PCT/EP2016/082624, filed on Dec. 23, 2016, the disclosure of which is hereby incorporated by reference in its entirety.

BACKGROUND

Embodiments of the present invention relate to network management and, more specifically, but not exclusively, to systems and methods for programming and/or management of mobile wireless networks.

Existing mobile networks are designed to scale when additional devices and/or applications are deployed. However, the scalability of the mobile network may result in inefficiencies. Additional systems and/or methods for efficiently providing mobile communication services to devices and/or applications are sought.

SUMMARY

It is an object of the present invention to provide an apparatus (network slice server), a system, a computer program product, and a method for slicing a network into network slices.

The foregoing and other objects are achieved by the features of the independent claims. Further implementation forms are apparent from the dependent claims, the description and the figures.

According to a first aspect, a network slice programming and management system for slicing a network to multiple groups of logical network slices composed of a collection of logical network functions, each dedicated to supporting a specific respective use for subscribers of the slice, comprising of a programming interface configured to receive commands for creation and/or configuration of network slice design comprising the constraints and requirements defining an architecture of logical network functions that when deployed form a network slice of a network, the commands include selection of at least one network function and a definition of an interaction of the selected at least one network function with other network functions.

The system (also referred to herein as a network slice programming and management system), method (e.g., implemented as code instructions stored in a storage device executed by one or more processors), apparatus and/or a computer program product described herein define a programming interface that is used to modularize control planes for mobile networks, for example 5th generation mobile technology (5G) and beyond. The operator of the mobile network and/or client of the mobile network uses the programming interface to define custom slices in the mobile network based on predefined and/or customized network functions. The slices are automatically programmed and deployed.

The system (also referred to herein as a network slice programming and management system), method (e.g., implemented as code instructions stored in a storage device executed by one or more processors), apparatus and/or a computer program product described herein provide a programming interface that is used to create logical network slices that support variable use cases, that may vary in terms of performance attributes and/or other requirements. Slices are defined for different devices and/or applications according to respective varying requirements of the device and/or application, in contrast to scaling a common architecture (e.g., one architecture fits all solution) as is common in existing mobile networks. Each device and/or application is associated with a network slice that is configured according to customized requirements of the device and/or application. For example, one type of slice(s) may define ultra-reliable communication for mission critical services, for example, eHealth, public safety, real-time vehicle control, tactile Internet, connectivity for drones, and the like. Another type of slice may define communication that does not necessarily need to provide high reliability and/or real-time response.

In a first possible implementation of the system according to the first aspect, the system further comprises a slice management component, configured to produce the network slice by creating a configured architecture on the basis of the network slice design in the network configuring the at least one network function according to the requirements of the slice requesting entity, deploying the configured architecture on the basis of the network slice design in the network by instantiating the network functions by an orchestrator, and interfacing with an access network to enable access of subscribers to the at least one network function of the slice independently from other network slices.

The configured architecture is automatically created and deployed in the network according to the network slice design, enabling access of subscribers to the slice independently of other network slices, which restricts resources to the respective slice, prevents use of resources by other network slices, and prevents access of subscribes to the other network slices.

In a second possible implementation form of the system according to the first implementation form of the first aspect, the slice management component is configured to receive from the programming interface an updated configuration including at least one of addition of a network function, removal of a network function, alteration of a network function, alteration of the interaction between the network functions, the SLA requirements of the slice including but not limited to the number of subscribers, coverage area, or any combination thereof.

In a third possible implementation form of the system according to any of the preceding implementation forms of the first aspect, wherein the slice management component is configured to perform at least one of add a subscriber and remove a subscriber by interfacing with an access network that enables the access of subscribers to the at least one network function.

In a fourth possible implementation form of the system according to any of the preceding implementation forms of the first aspect, the slice management component is configured to create upon deployment of the configured architecture a slice-management sub-component responsible for management of that particular instance of deployed configured architecture, the slice-management sub-component is configured to manage configuration of the network slice design exclusively and separately from that of other network slices.

Each slice-management sub-component is responsible for its own network slice, preventing use of resources of one network slice by subscribers to another network slice. Failure of one slice management sub-component only affects the associated network slice, while other network slices managed by other slice management sub-components continue to operate.

In a fifth possible implementation form of the system according to the preceding fourth implementation form of the first aspect, the slice management component is configured to receive information from the slice-management sub-component about configuration of the network slice and to update the deployment of the slice according to the received information.

In a sixth possible implementation form of the system according to the preceding fifth implementation form of the first aspect, the slice management component is configured to enable, according to the received information, access of a user to at least one function of the network slice.

In a seventh possible implementation form of the system according to any of the preceding fourth, fifth, and sixth implementation forms of the first aspect, the slice-management sub-component is configured to enable access of a user to at least one function of the slice according to the slice configuration exclusively and independently from enabling access of subscribers to functions of other network slices.

Subscribers of a certain network slice are unable to access unauthorized resources of other network slices.

In an eighth possible implementation form of the system according to the first aspect as such or according to any of the preceding implementation forms of the first aspect, the programming interface is configured to provide a plurality of predefined network functions and interactions between the network functions, to receive commands to select network functions and interactions from the database, and to configure the network slice design according to the selected network functions and interactions.

In a ninth possible implementation form of the system according to any of the preceding implementation forms of the first aspect, the slice management component is configured to create network functions and interactions according to instructions received via the programming interface.

In a tenth possible implementation form of the system according to the first aspect as such or according to any of the preceding implementation forms of the first aspect, the network functions include management functions of at least one of a list comprising connection management, mobility management, forwarding management, authentication, authorization and accounts for subscribers of the network slice, and security management.

In an eleventh possible implementation form of the system according to the first aspect as such or according to any of the preceding implementation forms of the first aspect, interactions between the network functions include at least one of a list comprising synchronous call, asynchronous call, networked connections such as but not limited to representational state transfer (REST) application programming interfaces (APIs) and remote procedure call (RPC).

In a twelfth possible implementation form of the system according to any of the preceding implementation forms of the first aspect, the slice management component is configured to check that the configured architecture includes constraints on network functions or on the interactions between the network functions as specified by the received commands, and to refuse deployment of the slice in case the required network functions or interactions are not included in the configured architecture.

Slices that may use excessive resources, are programmed with errors, and/or are malicious are prevented from being deployed, preventing damage to the network, preventing resources allocation problems in the network, and/or preventing network errors.

In a thirteenth possible implementation form of the system according to any of the preceding implementation forms of the first aspect, the slice management component is configured to check that the configured slice architecture matches predefined constraints of the network slice design and to refuse deployment of the slice in case the configured architecture does not satisfy the predefined constraints.

In a fourteenth possible implementation form of the system according to any of the preceding implementation forms of the first aspect, the slice management component is configured to check a certification of a network function included in the configured network architecture and to refuse deployment of the slice in case the network function is not certified.

In a fifteenth possible implementation form of the system according to any of the preceding implementation forms of the first aspect, the slice management component is configured to generate the network architecture according to data path architecture indicated via the programming interface.

In a sixteenth possible implementation form of the system according to any of the preceding implementation forms of the first aspect, the slice management component is configured to generate and provide more than one deployment options with corresponding monetary costs of the options and to deploy according to a selected option.

According to a second aspect, a network slice programming and management system for slicing a network to multiple groups of logical network slices composed of a collection of logical network functions, each dedicated to supporting a specific respective use for subscribers of the slice, comprises at least one processor configured to execute a code for receiving commands via a user interface for creation and/or configuration of network slice design comprising the constraints and requirements defining an architecture of logical network functions that when deployed form a network slice of a network, the commands include selection of at least one network function and a definition of an interaction of the selected at least one network function with other network functions; and producing the network slice by deploying a configured architecture on the basis of the network slice design in the network by instantiating the network functions by an orchestrator and configuring the at least one network function according to the configured architecture; and interfacing with an access network to enable access of subscribers to the at least one network function of the slice independently from other network slices.

According to a third aspect, a method for slicing a network to multiple groups of logical network slices composed of a collection of logical network functions, each dedicated to supporting a specific respective use for subscribers of the slice, comprises receiving commands via a user interface for creation and/or configuration of network slice design comprising the constraints and requirements defining an architecture of logical network functions that when deployed form a network slice of a network, the commands include selection of at least one network function and a definition of an interaction of the selected at least one network function with other network functions; and producing the network slice by deploying a configured architecture on the basis of the network slice design in the network by instantiating the network functions by an orchestrator and configuring the at least one network function according to the configured architecture; and interfacing with an access network to enable access of subscribers to the at least one network function of the slice independently from other network slices.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS

Figure 1:
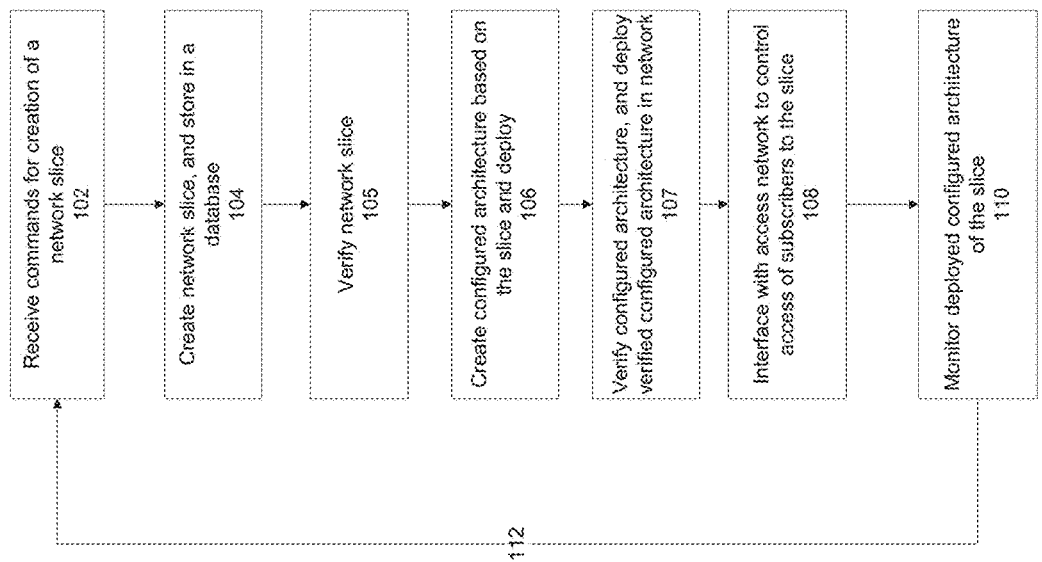
FIG. 1 is a flowchart of a method that defines one or more logical network slices for a mobile network that are each dedicated to a specific respective use for subscribers of the slice, in accordance with some embodiments of the present invention.

The present invention, in some embodiments thereof, relates to network management and, more specifically, but not exclusively, to systems and methods for programming and/or management of mobile wireless networks.

An aspect of some embodiments of the present invention relates to an apparatus (e.g., network slice server), a system (also referred to herein as a network slice programming and management system), a method (e.g., implemented as code instructions stored in a storage device executed by one or more processors), and/or a computer program product that defines slices of a mobile communication network to multiple groups of logical network slices. Each network slice is associated with a collection of logical network functions, optionally virtualized network functions. Each network function is dedicated to supporting a specific respective use for subscribers of the slice. The network functions of the slice define an architecture for a certain use, for example, a device and/or application, for example, real-time communication, high-reliability communication, and/or high-bandwidth communication. A configured architecture based on the network slice and requirement(s) of the network slice creator (e.g., user, requesting entity) is created and deployed in the mobile network.

The definition of the slices is performed using a programming interface (e.g., application programming interface (API), software development kit (SDK), graphical user interface (GUI)) that receives commands for creation and/or configuration of the respective network slice design. The network slice is further associated with constraints and/or requirements defining a configured architecture of logical network functions that when deployed forms the respective network slice of the mobile wireless network. Exemplary commands include selection of network function(s), and a definition of an interaction of the selected network function(s) with other network function(s).

The system (also referred to herein as a network slice programming and management system), method (e.g., implemented as code instructions stored in a storage device executed by one or more processors), apparatus and/or a computer program product described herein define a programming interface that may be used to modularize control planes for mobile networks, for example 5th generation mobile technology (5G) and beyond. The operator of the mobile network and/or client of the mobile network uses the programming interface to define custom slices in the mobile network based on predefined and/or customized network functions. The slices may then be deployed by the orchestration component.

The system (also referred to herein as a network slice programming and management system), method (e.g., implemented as code instructions stored in a storage device executed by one or more processors), apparatus and/or a computer program product described herein provide a programming interface that is used to create logical network slices that support variable use cases, that may vary in terms of performance attributes and/or other requirements. Slices are defined for different devices and/or applications according to respective varying requirements of the device and/or application, in contrast to scaling a common architecture (e.g., one architecture fits all solution) as is common in existing mobile networks. Each device and/or application is associated with a network slice that is configured according to customized requirements of the device and/or application. For example, one type of slice(s) may define ultra-reliable communication for mission critical services, for example, eHealth, public safety, real-time vehicle control, tactile Internet, connectivity for drones, and the like. Another type of slice may define communication that does not necessarily need to provide high reliability and/or real-time response.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
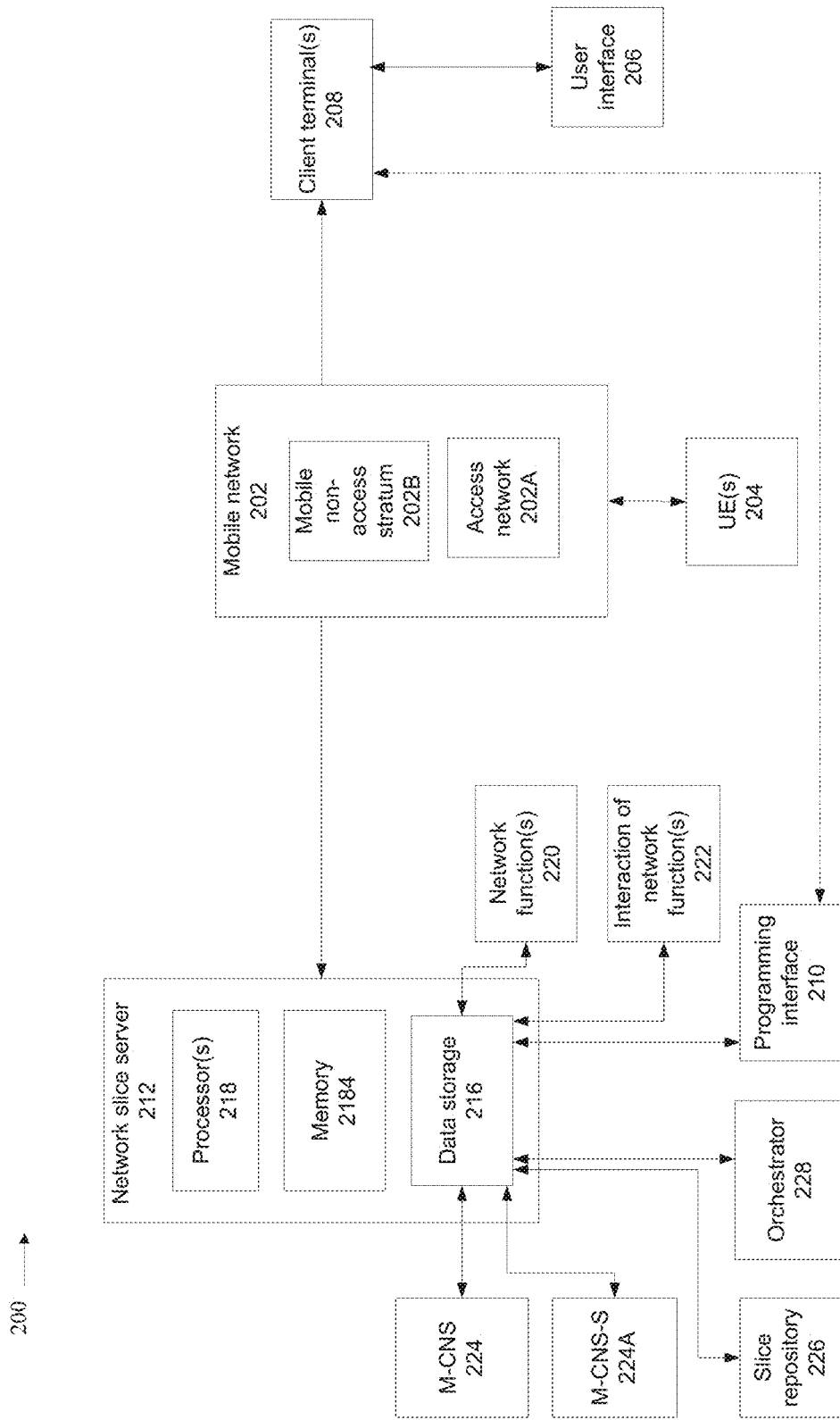
FIG. 2 is a block diagram of components of a system that defines one or more logical network slices for a mobile network, where each slice is dedicated to a specific respective use for user equipment subscribers of the slice, in accordance with some embodiments of the present invention.

Reference is now made to FIG. 1, which is a flowchart of a method that defines one or more logical network slices for a mobile network that are each dedicated to a specific respective use for subscribers of the slice, in accordance with some embodiments of the present invention. The method slices the mobile network to multiple groups of logical network slices composed of a collection of logical network functions, each dedicated to supporting a specific respective use for subscribers of the slice. Reference is also made to FIG. 2, which is a block diagram of components of a system 200 (also referred to herein as a network slice programming and management system) that defines one or more logical network slices for a mobile network 202, where each slice is dedicated to a specific respective use for user equipment (UE) 204 subscribers of the slice, according to data entered using a user interface 206 of a client terminal 208 accessing a programming interface 210 of a network slice server 212, in accordance with some embodiments of the present invention. One or more of the acts of the method described with reference to FIG. 1 are implemented as code instructions stored in a memory 214 and/or data storage device 216 executed by processor(s) 218 of network slice server 212, in accordance with some embodiments of the present invention. The following components described herein may be stored as code instructions: slice manager 224 224A (which creates the slice according to design instructions), slice repository 226 (which stores slice templates), orchestrator 228 (which deploys the created slice in the mobile network), programming interface 210 (that creates the design of the slice), network function templates 220 (which are used to create the slice), and interaction templates 222 (which are used to create the slice).

Network slice server 212 may be implemented as, for example, as a single computing device, a group of computing devices arranged for parallel processing, a network server, a web server, a computing cloud, a virtual server, a local server, and/or a remote server.

Processor(s) 218 be implemented as, for example, as central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 218 may be implemented as, for example, a single processor, a multi-core processor, and/or a cluster of processors arranged for parallel processing (which may include homogenous and/or heterogeneous processor architectures).

Memory 214 may be implemented as, for example, a hard drive, a random access memory (RAM), read-only memory (ROM), an optical drive, and/or other storage devices.

Data storage device 216 may be implemented as, for example, a random access memory (RAM), read-only memory (ROM), and/or a storage device, for example, non-volatile memory, magnetic media, semiconductor memory devices, hard drive, removable storage, optical media (e.g., DVD, CD-ROM), a remote storage server, and a computing cloud.

Mobile network 202 is implemented as, for example, a 5G network, that provides mobile communication services to UE 204. Mobile network 202 includes an access network 202A that provides communication between UE 204 and mobile network 202, for example, a radio access network, a wireless access point. Mobile network 202 includes a mobile non-access stratum 202A. As used herein, the term mobile network may include physical wire links to provide the UE with mobile communication services, for example, the physical backbone of the network. AF1, AF2, AFx, AFy represent the network functions defined for access network 202A. NF1, NF2, NF3, NFx, and NFy represent the network functions defined for the core network portion of mobile network 202.

The network architecture of mobile network 202 may be implemented according to Network Function Virtualization (NFV) and/or Software Defined Networks (SDN) paradigms, and/or implemented using dedicated hardware appliances. The control plane and/or the user plane (U-plane) for mobile network 202 may be implemented using virtual and/or physical infrastructures, for example, wireless Access Points (APs), Data Centers, Edge Data Centers, and/or Points of Presence. A transport network may interconnect the infrastructure elements. The transport network may be implemented, or example, using legacy connectivity methods, virtual links, virtual switches, and/or virtual routers managed by SDN controllers.

UE 204 may include, for example, a smartphone, a mobile device, a connected car, a glasses computer, a watch computer, a laptop, and a tablet computer.

Client terminal(s) 208 may access network slice server 212 over mobile network 202, and/or using other communication networks and/or interfaces (not shown), for example, the internet, a local area network, a private network, a wide area network, a virtual network, a cellular network, a Wi-Fi network, and a cable-based network.

Client terminal(s) 208 may be implemented, for example, as a single computing device (e.g., client terminal), a group of computing devices arranged in parallel, a network server, a web server, a computing cloud, a local server, a remote server, a mobile device, a stationary device, a server, a smartphone, a laptop, a tablet computer, a wearable computing device, a glasses computing device, a watch computing device, and a desktop computer.

Client terminal(s) 208 are in communication with a respective user interface 206 that presents data to a user and/or includes a mechanism for entry of data, for example, one or more of: a touch-screen, a display, a keyboard, a mouse, voice activated software, and a microphone.

Referring now back to FIG. 1, at 102, commands are received via user interface 206 (e.g., of client terminal 208) for creation and/or configuration and/or update of a network slice design that includes the constraints and/or requirements defining a configured architecture of logical network functions. When the configured architecture is deployed, a network slice of a mobile network is formed. The commands include selection of one or more network functions and/or a definition of an interaction of the selected network function with other network functions.

The network slice may be owned, for example, by a mobile operator and/or service provider. The network slice may be requested, for example, by a user and/or operator to provide defined mobile communication services for the deployed application and/or device.

The commands are received by accessing programming interface 210 stored on network slice server 212, for example, using a graphical user interface (GUI) that remotely accesses network slice server 212, an application locally installed on client terminal 208 that communicates with network slice server 212, and/or software as a service (SAAS) provided by server 212 to client terminal 208. It is noted that client terminal 208 may access programming interface using a different network (not shown), for example, a network other than the mobile network, such as the internet, a private network, a virtual network, a local area network, and/or other networks.

The network functions may be selected from a set of predefined network functions 220 (e.g., stored by network slice server 212), for example, templates, libraries, and/or virtual interface. The definition of the interaction of the selected network function with other network functions may be selected from a set of predefined interactions 222 (e.g., stored by network slice server 212).

Optionally, the user uses user interface 206 to select a pre-defined slice template (e.g., stored in a slice repository 226, optionally in association with network slice server 212). The pre-defined slice template may be customized, by editing existing network functions and/or interactions defined by the template, adding additional network functions and/or interactions to the template, and/or deleting network functions and/or interactions from the template, and/or scaling in and/or out the size of the NFs based on the number of users. Exemplary slice template may be defined, for example, for mIoT (medical internet of things), V2X (vehicle to everything communication), eMBB (enhanced Mobile Broadband). Templates may be provided for the control plane slice and the data plane slice. The existing templates may be provided by orchestrator 228 of the operator to instantiate, and/or another entity.

Programming interface 210 is designed to provide predefined network functions and/or interactions between the network functions for selection using user interface 206. Programming interface 210 receives commands to select the network functions 220 and/or interactions 222 (e.g., stored in a database by server network slice server 212). Programming interface 210 configures the network slice design according to the selected network functions and interactions. Programming interface 210 creates the design of the slice.

Network functions may refer to Core Network (CN) Control Plane (CP) network functions.

Exemplary network functions include management functions of one or more lists that include:
Connection Management (CM) that terminates the non-access stratum at the core network side. The connection management manages and/or enables key device procedures: access connection management, forwarding with management, identifiers resolution, address allocation, service request, and slice attachment.
Mobility Management (MM) that manages device reachability, tracking area management, paging, and handover procedures.
Forwarding Management (FM) that performs packet routing configuration for the data plane.
Authentication and/or Authorization (AA) and accounts for subscribers of the network slice.
Security Management (SM) that performs Access and Non Access Strata security management.

Exemplary interactions between the network functions include: one or more lists that include synchronous call(s), asynchronous call(s), networked connections such as but not limited to representational state transfer (REST) application programming interfaces (APIs) and remote procedure call (RPC).

Slice management component 224 (also referred to herein as the management and programming component for Core Network Slice (M-CNS)) receives from programming interface 210, an updated configuration including at least one of:

addition of a network function, removal of a network function, alteration of a network function, alteration of the interaction between the network functions, addition of a subscriber and removal of a subscriber, or any combination thereof. M-CNS 224 may be implemented as a logical component that interfaces with orchestrator 228 to use the orchestrator functions for deployment of slices (e.g., control plane and/or data plane slices) in mobile network 202.

It is noted that slice management component 224 and programming interface 210 may be implemented as a single component that performs that functions described herein with reference to slice management component 224 and programming interface 210. Alternatively, slice management component 224 and programming interface 210 may be implemented as separate components.

One or more slices may be defined, including a resource slice and/or a service slice. The resource slice defines computing and/or mobile network resources that are allocated to support the communication and operation of the service slice. The service slice refers to a CN CP slice, which is defined by a set of logical CN CP NFs and related logical interconnections. The NFs define a control plane (C-plane) that supports the communication services for a particular cluster of services having homogenous functional and performance requirements. The C-plane may be defined using a library of Control and/or Management Applications.

User interface 206 may be used to access network slice server 212 to define a customized set of management applications for performing a specified role related to the slice defined by the user. The control and/or management applications may be applied to the data plane.

User interface 206 may be used to access network slice server 212 to define policy related parameters for the defied slice (for the control and/or data plane slices), for example, a service level agreement (SLA), and/or performance metrics. Policy related parameters may include the specification of the network functions and/or interactions, for example, inter-dependencies and/or information flow specification between the network functions.

At 104, slice management component 224 creates the network slice according to the received network functions and/or interactions. Slice management component 224 creates network functions and/or interactions according to design instructions received from user interface 206 via programming interface 210.

The created network slice may be stored in a storage device (e.g., data storage 215), optionally in a database that maps stored network slices to users, for example, in slice repository 226.

At 105, verification(s) are performed on the created network slice. The checks may be performed by a verification engine (not shown), for example, stored as code in data storage 216, executable by processor(s) 218 of network slice server 212. Sanity checks may be performed for the control plane slice and the data place slice. The checks may be performed using a predefined slice template representing a standard. The checks may be performed for semantics and syntactic correctness. The checks may be performed for compliance with a predefined set-of-rules, for example defined by the administrator of the mobile network.

At 106, a configured architecture is created based on the requirements defined by the slice requestor (e.g., user) and based on the created network slice. The configured architecture may be created by slice management component 224. Slice management component generates the network architecture according to data path architecture indicated via the programming interface 210.

Slice management component 224 generates and provides more than one deployment option with corresponding monetary costs of each of the options and to deploy according to a selected option. Each option may be associated with a service level agreement between the slice owner (i.e., user generating the slice) and the operator of the mobile network. The agreement associated with the selected option, and the instantiation details of the slice (optionally provided by orchestrator 228) may be provided to another component (e.g., L-CNS, not shown) that hands assurance of the life cycle of the service associated with the selected option of the slice. The resources may be reserved (e.g., by orchestrator 228) for the slice for a predefined limited period of time to allow the slice owner (i.e., user) to make the selection and confirm the price.

The configured architecture is deployed in mobile network 202 by slice management component 224 instantiating the network functions using orchestrator 228. The owner of orchestrator 228 may or may not own the physical infrastructure of mobile network 202. The network function(s) is configured according to the configured architecture. Orchestrator 228 provides orchestration of computing and/or network responses of the infrastructure, deploy service configured architectures upon the infrastructure according to the deployment template, and/or manage the lifecycle of the service slices (i.e., the deployed configured architectures).

Slice management component 224 (and/or orchestrator 228) is configured to create upon deployment of the configured architecture a slice-management sub-component 224A responsible for management of that particular instance of deployed configured architecture. Each slice and/or configured architecture is associated with a newly created instance of slice-management sub-component 224A. Slice-management sub-component 224A is configured to manage configuration of the network slice and/or configured architecture design exclusively and separately from that of other network slices and/or other configured architectures.

Slice-management sub-component 224A may provide an interface that is used to enable and/or access and/or define the basic management and/or operations of the configured architecture that has been deployed. The data provided using the interface may be provided directly to the user using user interface 206, and/or indirectly after processing by network slice server 212 and/or other entities. Slice-management sub-component 224A enables user access and/or device access to the configured architecture of the slice.

Slice management component 224 is configured to receive information from the slice-management sub-component 224A about configuration of the network slice design and to update the deployment of the configured architecture according to the received information.

At 107, the created configured architecture is verified before deploying. The verified configured architecture is deployed in mobile network 202. The checks may be performed by the verification engine and/or by slice management component 224. Sanity checks may be performed for the control plane slice and the data place slice. The checks may be performed for semantics and syntactic correctness. The checks may be performed for compliance with a predefined set-of-rules, for example defined by the administrator of the mobile network.

Slice management component 224 checks that the configured architecture includes constraints on network functions and/or constraints on the interactions between the network functions as specified by the received commands. Slice management component 224 refuses deployment of the slice in case the required network functions and/or interactions are not included in the configured architecture.

Alternatively or additionally, slice management component 224 checks that the configured slice architecture matches predefined constraints of the network slice design. Slice management component 224 refuses deployment of the slice in case the configured architecture does not satisfy the predefined constraints.

Alternatively or additionally, slice management component 224 checks a certification of a network function included in the configured network architecture. Slice management component 224 refuses deployment of the slice in case the network function is not certified.

Alternatively or additionally, slice management component 224 checks a certification of a network function included in the configured network architecture. Slice management component 224 refuses deployment of the slice in case the network function is not certified.

At 108, network server 212 interfaces with access network 202A to enable access of subscribers (UE 204) to the network function of the configured architecture of the slice independently from other network configured architectures of other slices.

Slice management component 224 enables, according to the received information, access of a user to function(s) of the deployed configured architecture. Slice-management sub-component 224A enables access of a user to at least one function of the configured architecture according to the slice configuration and/or slice requirements exclusively and independently from enabling access of subscribers (UE 204) to functions of other network configured architectures.

Addition of a subscriber (UE 204) and removal of a subscriber (UE 204) are performed by network slice server 212 interfacing with access network 202A that enables access of subscribers (UE 204) to the network function.

At 112, blocks 102-110 are iterated, optionally dynamically, to updated and/or adjust the created slices. The adjusted configured architectures are monitored. Blocks 102-110 may be iterated to create new slices.

Figure 3:
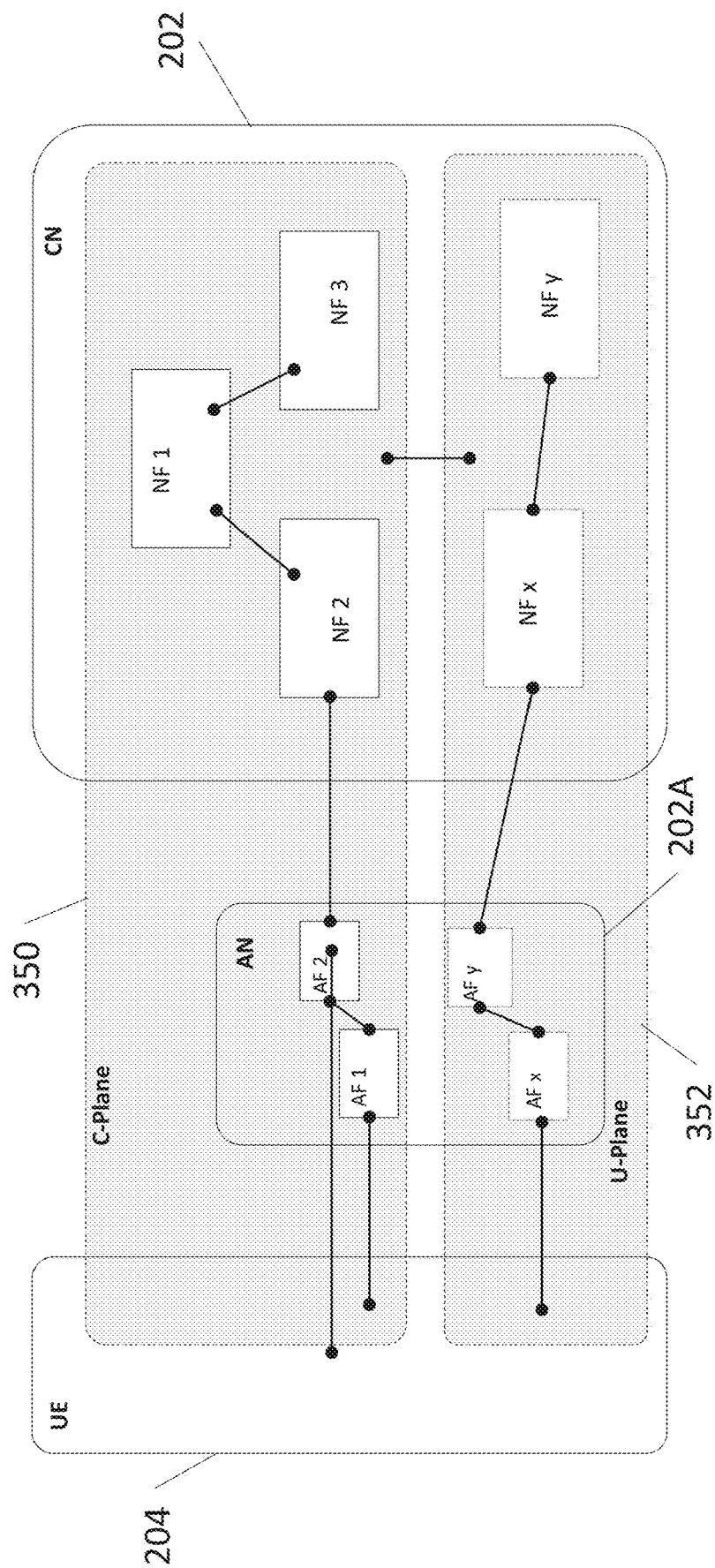
FIG. 3 is a schematic depicting an example implementation of an network interconnectivity reference model that defines a separation between a control plane and a user plane), in accordance with some embodiments of the present invention.

Reference is now made to FIG. 3, which is a schematic depicting an exemplary implementation of a network interconnectivity reference model that defines a separation between a control plane (C-plane) 350 and a user plane 352 (U-plane), in accordance with some embodiments of the present invention. C-plane 350 and U-plane 352 may be created as part of a single network slice, or as separate network slices. C-plane 350 and U-plane 352 are created by the method described with reference to FIG. 1, and/or using system 200 described with reference to FIG. 2. The term data plane as used herein may be interchanged with the term user plane.

Figure 4:
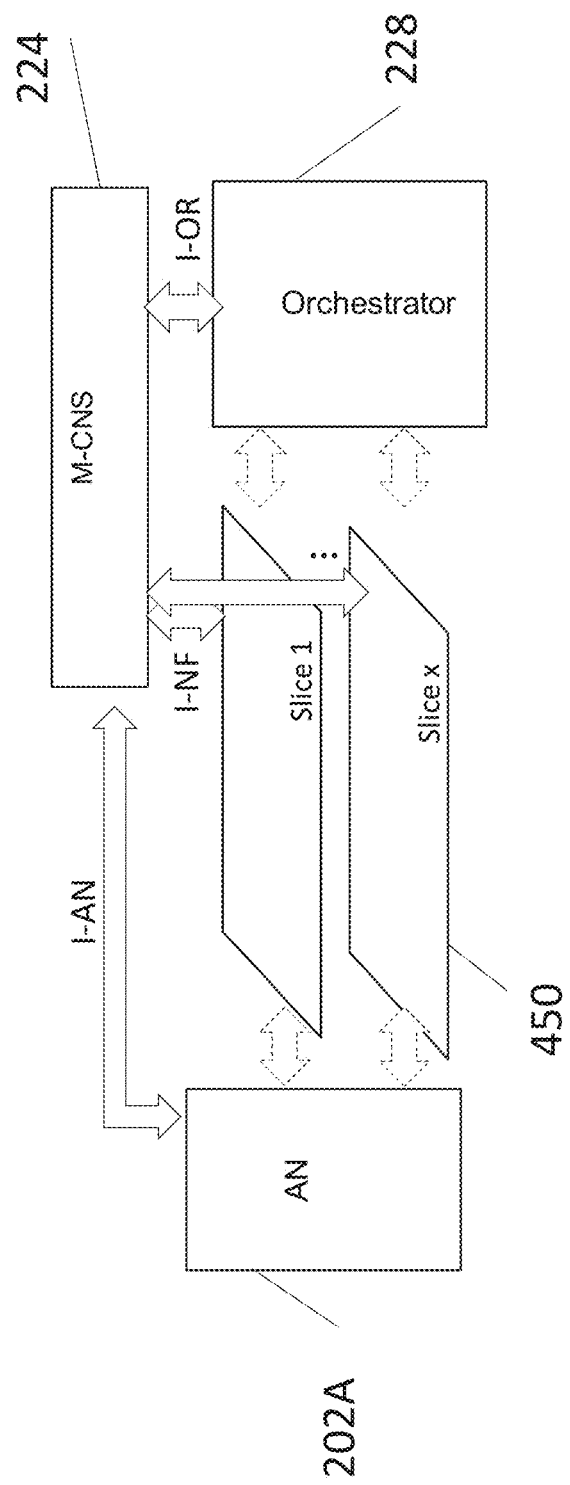
FIG. 4 is a schematic of an exemplary architecture depicting creation of one or more slices based on exemplary dataflow between components of the system described with reference to FIG. 2, in accordance with some embodiments of the present invention.

Reference is now made to FIG. 4, which is a schematic of an exemplary architecture depicting creation of one or more slices 450 based on exemplary dataflow between components of system 200 described with reference to FIG. 2, in accordance with some embodiments of the present invention. The management and programming component for core network slice (M-CNS) 224 interfaces with orchestrator 228 and access network 202A, as described herein. It is noted that M-CNS 224 is also sometimes referred to herein as slice manager 224.

Figure 5A:
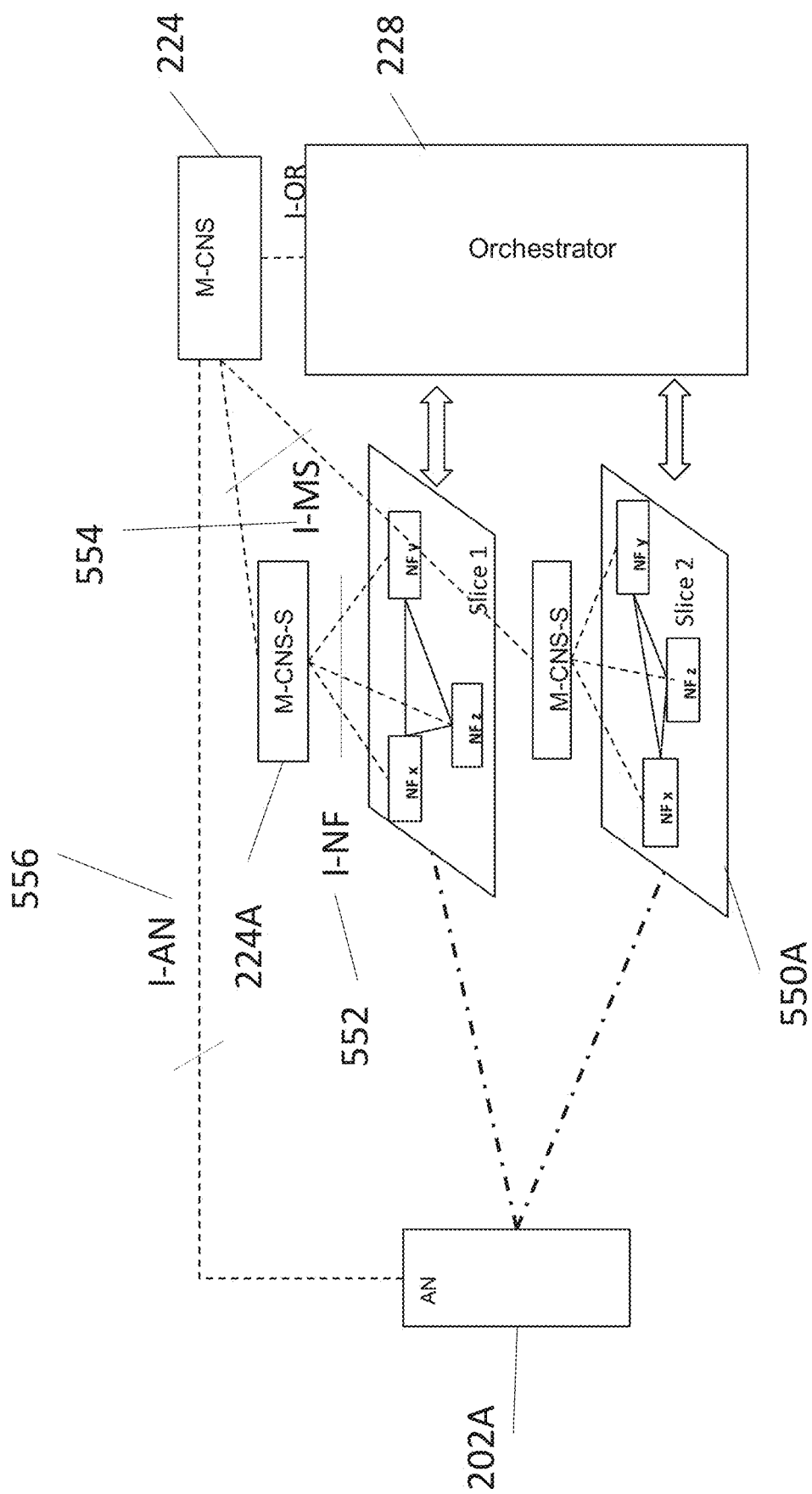
FIGS. 5A-5C are schematics of exemplary implementations according to the architecture of FIG. 4, in accordance with some embodiments of the present invention.
Figure 5B:
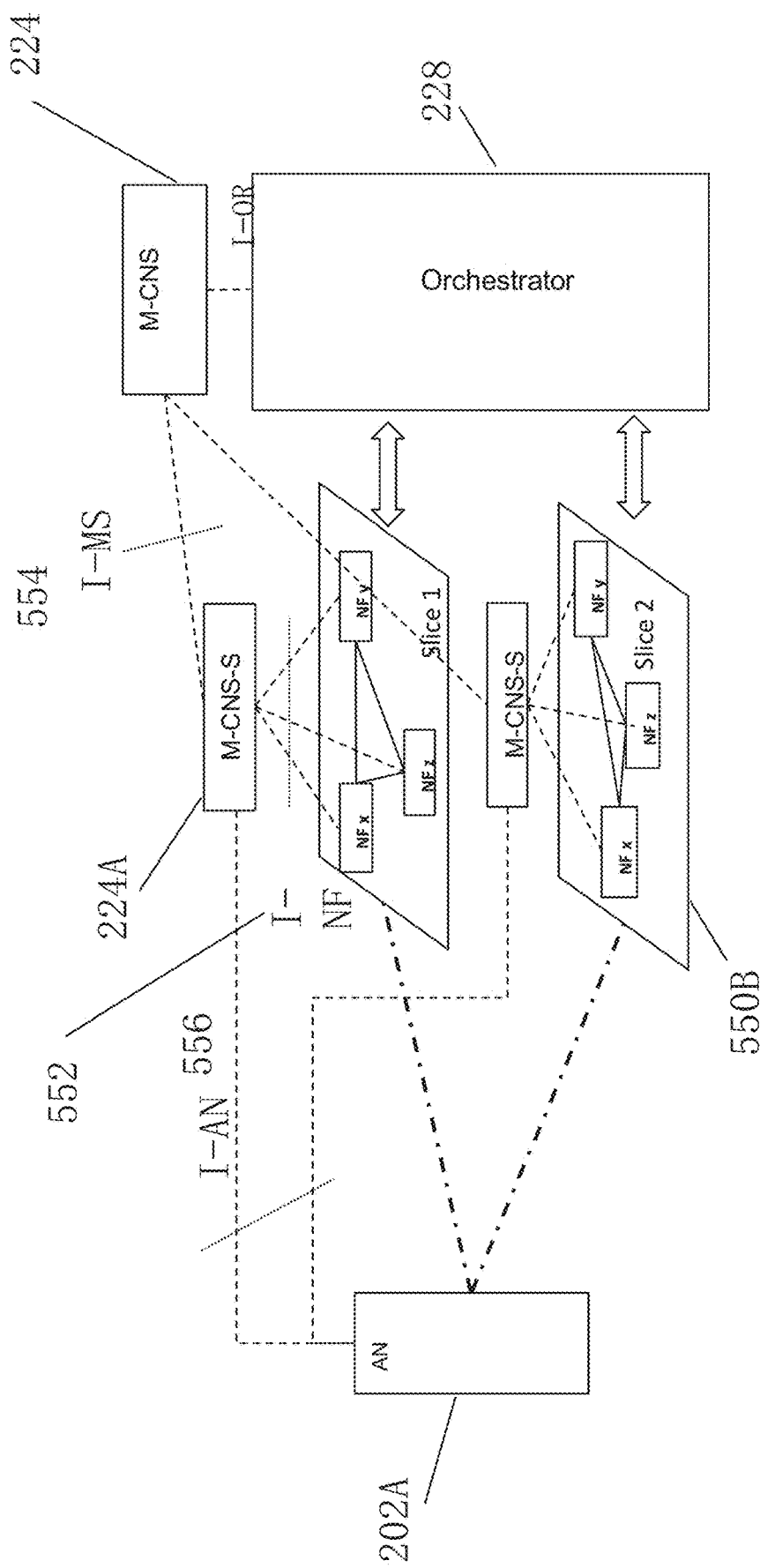
Figure 5C:
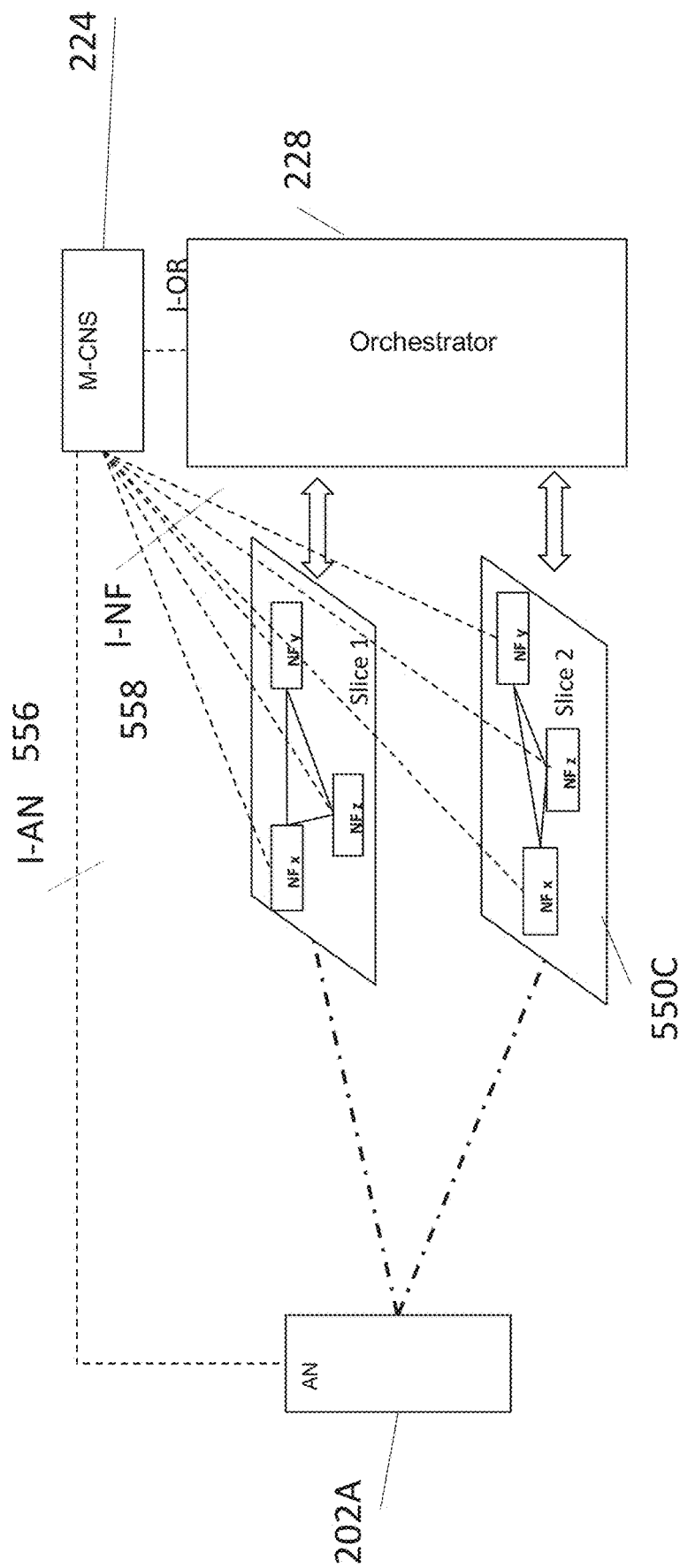

Reference is now made to FIGS. 5A-5C, which are schematics of exemplary implementations according to the architecture of FIG. 4, in accordance with some embodiments of the present invention. The interfaces described with reference to FIGS. 5A-5C may be physical and/or virtual interfaces, for example, using wireless links and/or cable based links, a software interface and/or a hardware port.

FIG. 5A depicts an implementation of the architecture according to FIG. 4, that includes a sub-entity M-CNS-S 224A (used by M-CNS 224) to manage the NFs for each slice 550A using interface I-NF 552. M-CNS 224 uses interface I-MS 554 to manage M-CNS-S 224A. M-CNS 224 communicates with access network 202A using interface I-AN 556.

FIG. 5B depicts an implementation of the architecture according to FIG. 4, that includes M-CNS-S 224A that manages the NFs for each slice 550B. M-CNS 224 uses interface I-MS 554 to manage M-CNS-S 224A. M-CNS-S 224A communicates with access network 202A using interface I-AN 556.

FIG. 5C depicts an implementation of the architecture according to FIG. 4, where M-CNS 224 communicates directly with each slice 550C and/or manages the NF for each slice 550C using interface(s) I-NF 558. M-CNS 224 communicates with access network 202A using interface I-AN 556.

It is noted that M-CNS 224 described with reference to FIGS. 5A-5C may perform configurations in the data plane and/or in access network 202A to ensure proper functioning of the slices.

Figure 6:
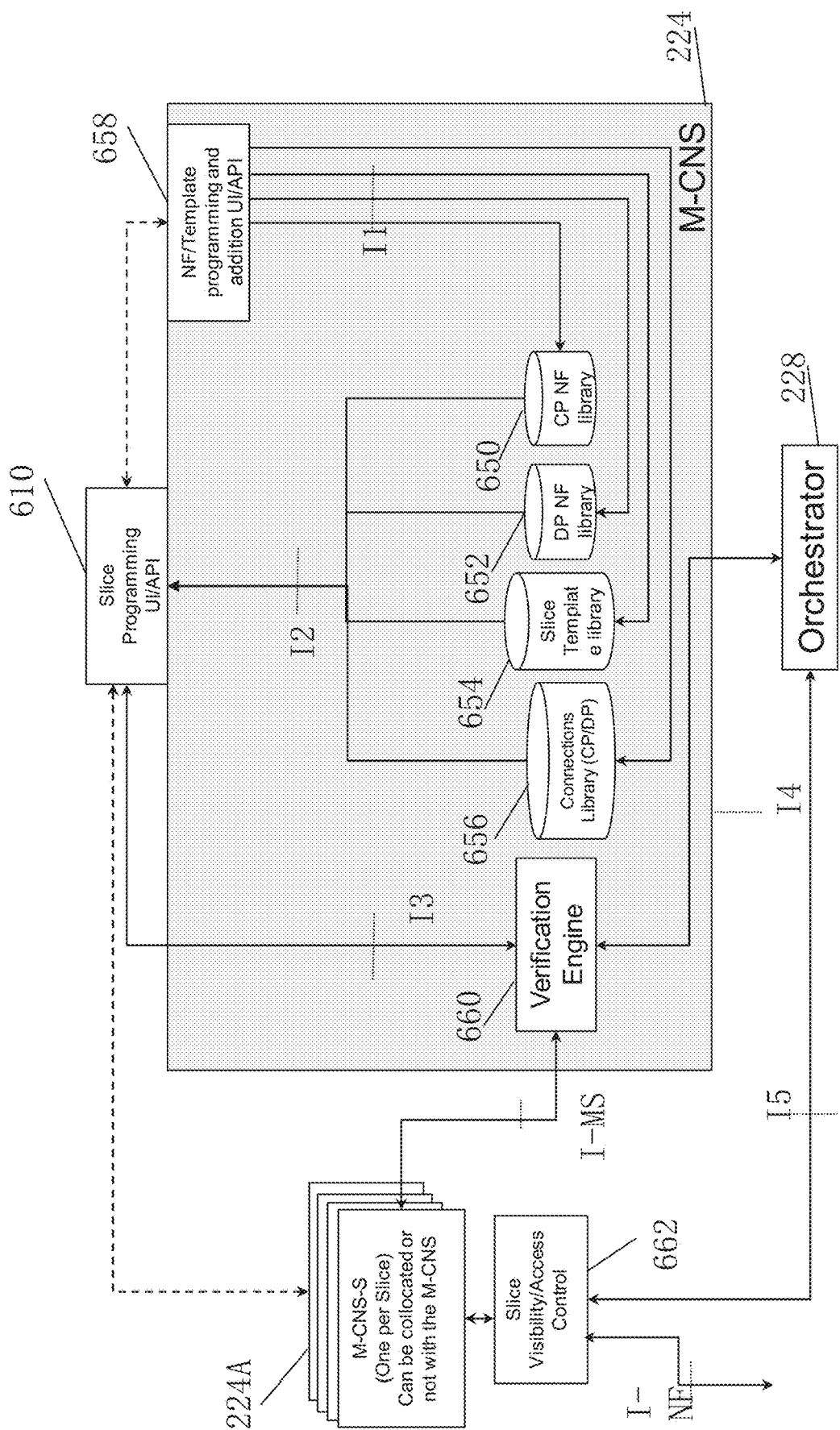
FIG. 6 is a block diagram of exemplary components of an exemplary architectural implementation of the M-CNS (Core Network Slice, also referred to herein as slice manager), in accordance with some embodiments of the present invention.

Reference is now made to FIG. 6, which is a block diagram of exemplary components of an exemplary architectural implementation of the M-CNS (also referred to herein as slice manager, for example, component 224 of system 200 described with reference to FIG. 2), in accordance with some embodiments of the present invention. M-CNS 224 may be hosted by the mobile operator, or stored at a different location.

M-CNS 224 provides the slice owner with a mechanism to create the slice. Slice programming interface 610 (e.g., user interface, API) is provided to the user (e.g., using a client terminal, as described herein). A pre-existing library of NFs may be provided for re-use and/or modification by the user (as described herein), including a library of control plane NFs 650, a library of data plane NFs 652, and/or a library of slice templates 654. The M-CNS defines different ways in which the NFs may be connected to form the slice using a connections library 656. Each connection type has an influence on the way orchestrator 228 implements the slice. Each connection type determines the type of dependency one NF has on another NF while specifying the flow of information between the NFs. A library of standard templates supported by orchestrator 228 may be provided.

The slice owner (and/or user) may add customized NFs and/or define new connections via interface I1, which are optionally stored in the existing libraries. Each NF may be associated with constraints and/or requirement on how the respective NF connects with other components. For example NFa may be associated with a requirement that defines an obligatory connection to NFb (i.e., a strict dependency) and an optional connection to NFc. Frequently used NF combinations may be created and/or stored in library of Slices (Slice template library) 654.

The slice owner (and/or user) may view the content of the library using slice programming UI/API 610. The user may create and/or configure a customized and/or new slice based on the available templates, NFs and/or connection types 658. The created slice is deployed into the network using interface I3.

Prior to deployment and/or during creation of the slice, verification engine 660 checks the slice for validity in terms of the certification of components used and/or the way the components are connected, and/or other defined criteria. For example, verification engine 660 ensures that obligatory connections defined by the NF are provided and that all dependencies amongst the NFs are met. M-CNS 224 refuses to create the slice when the verification fails. The restrictions and/or requirements may be related to security and/or other aspects. Orchestration 228 using Interface I4 may be used to deploy the slice. Each slice owner may define a data plane slice and a control plane slice that complement each other to create the entire service offering of the slice.

When the slice is created and the configured architecture is ready for deployment, Orchestrator 228 recommends one or more possible price details for realizing the slice in the operator domain. The slice owner (and/or user) may select a certain price detail and deploy the programmed slice using interfaces I4/I3. Orchestrator 228 may create the slice within the operator's network. An interface 662 to configure, control, and/or manage the data plane and/or the control plane are provided to the slice owner by orchestrator 228 using slice access enabling component (M-CNS-S) 224A over Interface I5. The element management interfaces to each of the NFs and/or interfaces to the overall slice management, using M-CNS-S 224A. An instance of M-CNS-A 224A is associated with each slice, one per slice.

M-CNS-S 224A with slice visibility/access/enablement control 662 ensures that the commands for configuration (e.g., addition and/or removal of an end user to the slice) is performed by the owner of the slice (i.e., not by other users), and performed on the slice created by the user (i.e., not on slices of other users). M-CNS-S 224A ensures slice based access separation and/or hides the actual internals of the slice implementation in the network. M-CNS-S 224A may be implemented by being collocated with M-CNS 224.

M-CNS-A 224A providing a direct management interface to the slice owner and/or user for defining the NFs. M-CNS-A 224A abstracts the actual physical infrastructure to enable basic operation and management functionalities.

M-CNS-S 224A reports on the performance of the slice and/or enables the slice owner and/or user to perform modifications to the deployed slice using interface I-MS. The modifications are verified by M-CNS verification engine 660.

To create an end to end solution that involves the access network and the core network, M-CNS-S 224A may configure the slice parameters in the radio resources using an interface to the access network. M-CNS-S 224A includes an interface to the AN-C to receive and/or manage the slice view of the slice owner (and/or user) in the radio resource that helps create a slice specific view of the radio resources to the slice owner (and/or user). M-CNS-S 224A is responsible for the configurations of the NFs that belong to the slice, for example, adding slice end-users to the AAA (Authentication, Authorization, and Accounting services) NF.

Figure 7:
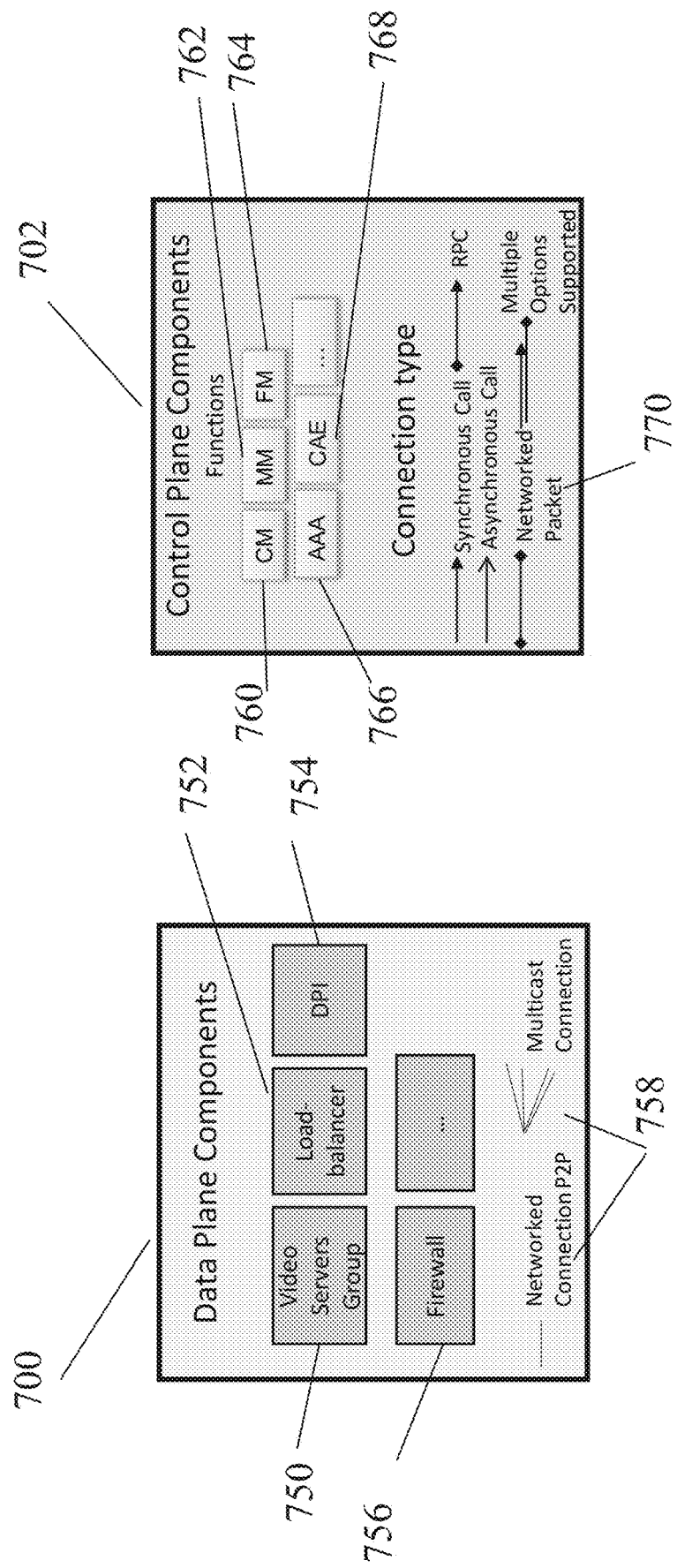
FIG. 7 is a block diagram depicting exemplary components of a data plane slice and a control plane slice created by the M-CNS, in accordance with some embodiments of the present invention.

Reference is now made to FIG. 7, which is a block diagram depicting exemplary components of a data plane slice 700 and a control plane slice 702 created by the M-CNS, in accordance with some embodiments of the present invention. Data plan slice components 700 and control plane slice components 702 include a library of NFs, and/or include one or more possible ways of providing connectivity.

Exemplary data plane slice components 700 include a video servers group 750, a load balancer 752, a DPI (deep packet inspector) 754, and a firewall 756. Connection 758 options include a P2P (point to point) network connection, and a multicast connection.

Exemplary control plane slice components 702 include CM 760, MM 762, FM 764, AAA 766, and CAE (computer aided engineering) 768. Exemplary connection 770 options include synchronous call, asynchronous call, networked packet, RPC (remote procedure call), and multiple options supported.

Figure 8:
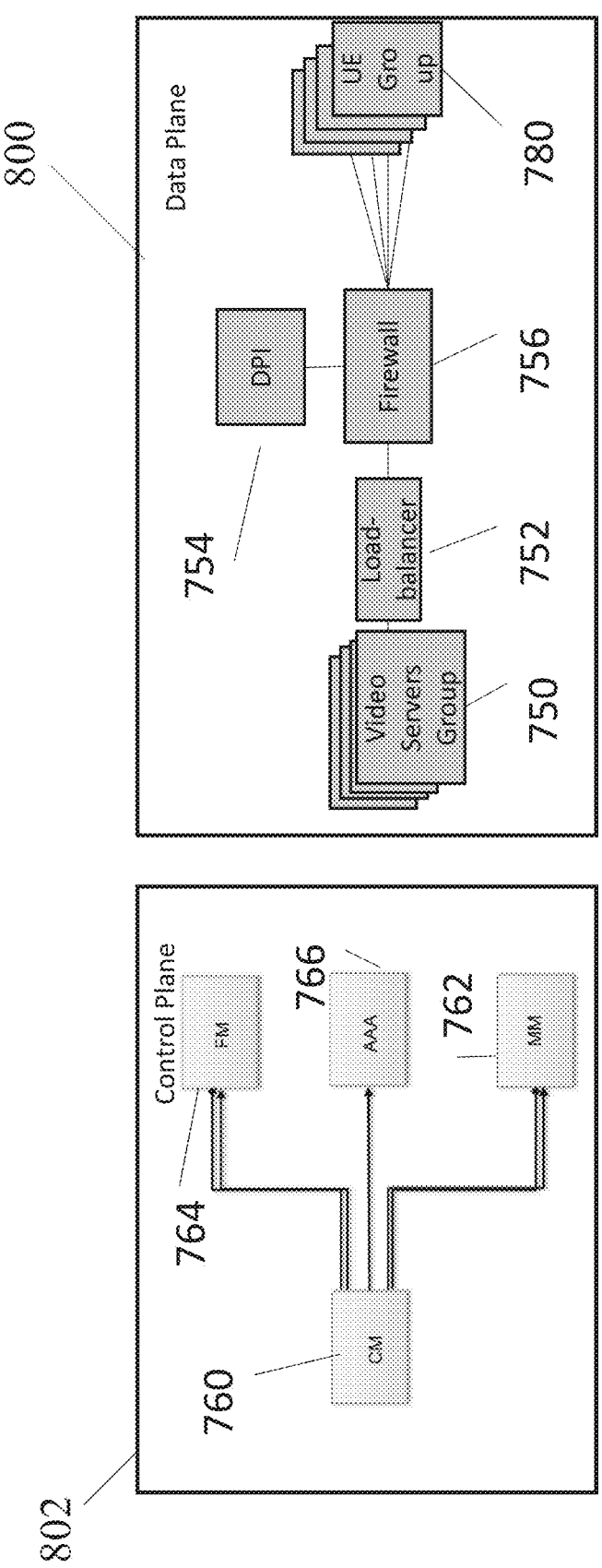
FIG. 8 is a schematic depicting exemplary connections between network functions defined by the data plane slice components and exemplary connection defined by the control plane slice components described with reference to FIG. 7, in accordance with some embodiments of the present invention.

Reference is now made to FIG. 8, which is a schematic depicting exemplary connections 800 between network functions defined by the data plane slice components and exemplary connection 802 defined by the control plane slice components described with reference to FIG. 7, in accordance with some embodiments of the present invention. With reference to exemplary connections 800, CM 760 is connected to each of FM 764, AAA 766, and MM 762. With reference to exemplary connections 802, video servers group 750 is connected to load balancer 752. Load balancer 752 is connected to firewall 756. Firewall 756 is connected to DPI 754 and user equipment (UE) group 780.

Each NF may define obligatory connections to other NFs. The obligatory connections are a defined requirement for the slice to be instantiable. The slice owner (and/or user) may create the customized slice by selecting the NFs from the NF library for control plane and data plane components, including the connections to interconnect the components, as depicted in exemplary connections 800 and 802. The inter-connectivity logic between control plane and data plane may be, for example, automatically generated by code that analyzes the control plane and data planes, manually defined by the user, and/or generated according to predefined connections and/or set-of-rules and/or other implementations. Each NF and connection may be associated with a respective set of preferences and/or limitations. For example, the Video group servers 750 may be associated with a requirement for location in Germany, and UE group 780 may be associated with a requirement to provide coverage across the entire area of Munich city.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant mobile networks will be developed and the scope of the term mobile network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A network slice programming and management system for slicing a network to multiple groups of logical network slices composed of a collection of logical network functions, each dedicated to supporting a specific respective use for subscribers of the slice, comprising of a programming interface configured to:

receive commands for at least one of creation or configuration of network slice design comprising instructions defining an architecture of the logical network functions that when deployed form a network slice of a network, the commands include selection of at least one network function and a definition of an interaction of the selected at least one network function with other network functions;

wherein the system further comprises a slice management component, configured to produce the network slice by:

creating a configured architecture on the basis of the network slice design in the network configuring the at least one network function according to requirements of a slice requesting entity;

deploying the configured architecture on the basis of the network slice design in the network by instantiating the network functions by an orchestrator;

interfacing with an access network to enable access of subscribers to the at least one network function of the slice independently from other network slices; and checking a certification of a network function included in the configured network architecture and refusing deployment of the slice in response to the network function not being certified.

2. The system of claim 1, wherein the slice management component is configured to receive from the programming interface an updated configuration including at least one of addition of a network function, removal of a network function, alteration of a network function, alteration of the interaction between the network functions, service level agreement (SLA) requirements of the slice including but not limited to the number of subscribers, coverage area, or any combination thereof.

3. The system of claim 1, wherein the slice management component is configured to create upon deployment of the configured architecture a slice-management sub-component responsible for management of that particular instance of deployed configured architecture, the slice-management sub-component is configured to manage configuration of the network slice design exclusively and separately from that of other network slices.

4. The system of claim 3, wherein the slice-management sub-component is configured to enable access of a user to at least one function of the slice according to the slice configuration exclusively and independently from enabling access of subscribers to functions of other network slices.

5. The system of claim 1, wherein the programming interface is configured to provide a plurality of predefined network functions and interactions between the network functions, to receive commands to select network functions and interactions from the database, and to configure the network slice design according to the selected network functions and interactions.

6. The system of claim 1, wherein the slice management component is configured to create network functions and interactions according to instructions received via the programming interface.

7. The system of claim 1, wherein the network functions include management functions of at least one of a list comprising connection management, mobility management, forwarding management, authentication, authorization and accounts for subscribers of the network slice, and security management.

8. The system of claim 1, wherein the interactions between the network functions include at least one of a list comprising synchronous call, asynchronous call, networked connections such as but not limited to representational state transfer (REST) application programming interfaces (APIs) and remote procedure call (RPC).

9. The system of claim 1, wherein the slice management component is configured to check that the configured architecture includes constraints on network functions or on the interactions between the network functions as specified by the received commands, and to refuse deployment of the slice in response to the required network functions or interactions being not included in the configured architecture.

10. The system of claim 1, wherein the slice management component is configured to check that the configured slice architecture matches predefined constraints of the network slice design and to refuse deployment of the slice in response to the configured architecture not satisfying the predefined constraints.

11. The system of claim 1, wherein the slice management component is configured to generate the network architecture according to data path architecture indicated via the programming interface.

12. A network slice programming and management system for slicing a network to multiple groups of logical network slices composed of a collection of logical network functions, each dedicated to supporting a specific respective use for subscribers of the slice, the system comprising:
at least one processor configured to execute a code for:
receiving commands via a user interface for at least one of creation or configuration of network slice design comprising instructions defining an architecture of the logical network functions that when deployed form a network slice of a network, the commands include selection of at least one network function and a definition of an interaction of the selected at least one network function with other network functions; and
producing the network slice by:
creating a configured architecture on the basis of the network slice design in the network configuring the at least one network function according to requirements of a slice requesting entity;
deploying the configured architecture on the basis of the network slice design in the network by instantiating the network functions by an orchestrator and configuring the at least one network function according to the configured architecture;
interfacing with an access network to enable access of subscribers to the at least one network function of the slice independently from other network slices; and
checking a certification of a network function included in the configured network architecture and refusing deployment of the slice in response to the network function not being certified.

13. The system of claim 12, wherein the at least one processor is further configured to provide a plurality of predefined network functions and interactions between the network functions, to receive commands to select network functions and interactions from the database, and to configure the network slice design according to the selected network functions and interactions.

14. The system of claim 12, wherein the at least one processor is further configured to create network functions and interactions according to instructions received via a programming interface.

15. The system of claim 12, wherein the network functions include management functions of at least one of a list comprising connection management, mobility management, forwarding management, authentication, authorization and accounts for subscribers of the network slice, and security management.

16. A method for slicing a network to multiple groups of logical network slices composed of a collection of logical network functions, each dedicated to supporting a specific respective use for subscribers of the slice, the method comprising:
receiving commands via a user interface for at least one of creation or configuration of network slice design comprising instructions defining an architecture of logical network functions that form a network slice of a network in response to the logical network functions being deployed, the commands include selection of at least one network function and a definition of an interaction of the selected at least one network function with other network functions; and
producing the network slice by:
creating a configured architecture on the basis of the network slice design in the network configuring the at least one network function according to requirements of a slice requesting entity;
deploying configured architecture on the basis of the network slice design in the network by instantiating the network functions by an orchestrator and configuring the at least one network function according to the configured architecture;
interfacing with an access network to enable access of subscribers to the at least one network function of the slice independently from other network slices; and
checking a certification of a network function included in the configured network architecture and refusing deployment of the slice in response to the network function not being certified.

17. The method of claim 16, further comprising: providing a plurality of predefined network functions and interactions between the network functions, to receive commands to select network functions and interactions from the database, and to configure the network slice design according to the selected network functions and interactions.

18. The method of claim 16, further comprising: creating network functions and interactions according to instructions received via a programming interface.

* * * * *